April 15, 1952 M. O. ELLINGTON 2,592,877
DRILLING GAUGE
Filed Jan. 20, 1950
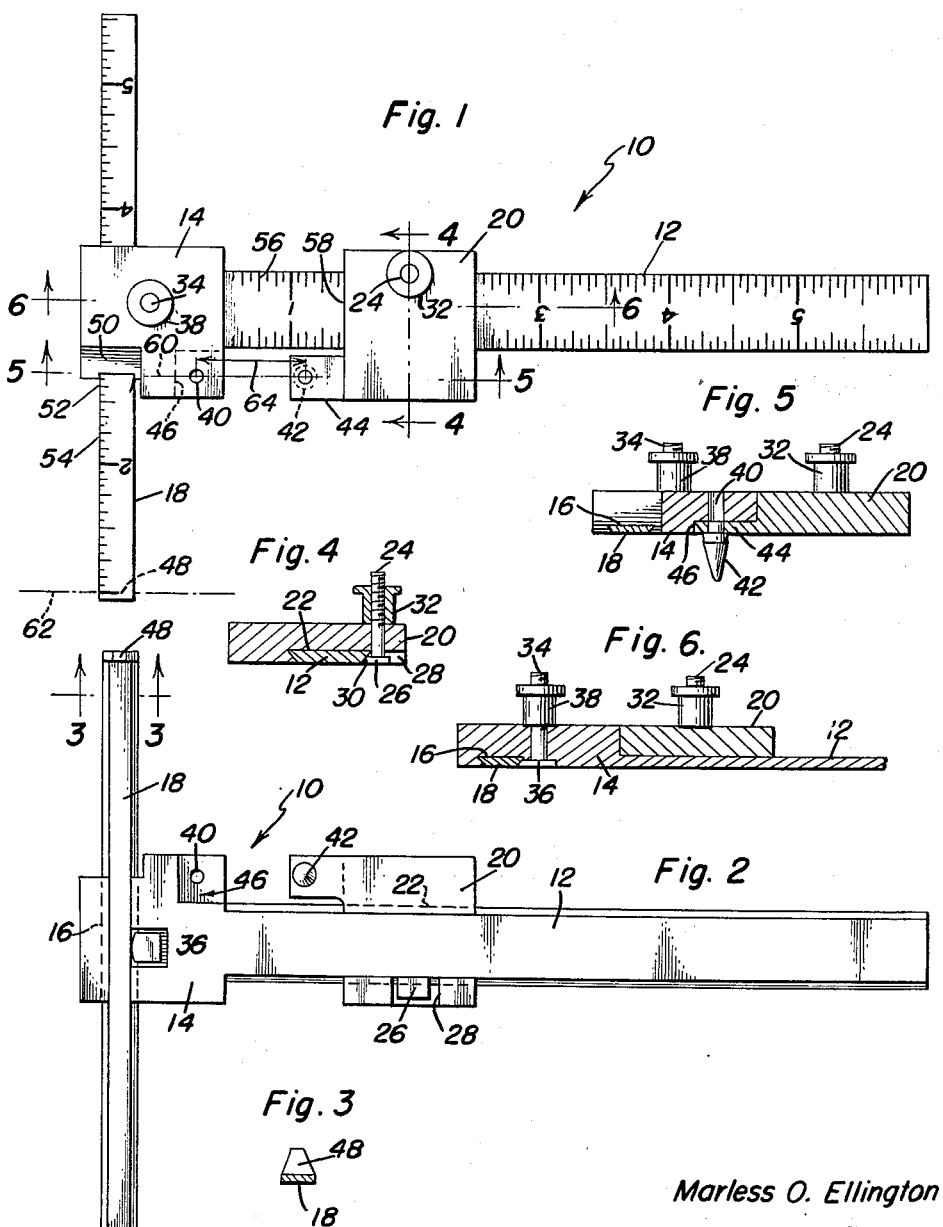
Marless O. Ellington
INVENTOR.

UNITED STATES PATENT OFFICE 2,592,877

DRILLING GAUGE

Marless O. Ellington, Lake City, Ark.

Application January 20, 1950, Serial No. 139,633

1 Claim. (Cl. 33—189)

This invention relates to new and useful improvements and structural refinements in drilling gauges, and the principal object of the invention is to facilitate convenient and expeditious drilling of a row of holes in a piece of work, particularly in instances where it is desired to have such holes equally spaced from one another and from an edge of the material, although the invention provides means for having the spacing of the holes from the edge different from the mutual spacing of the holes themselves.

This object is achieved by the provision of the instant gauge which includes an elongated scale having an enlarged head at one end thereof, a ruler slidable in the head at right angles to the scale for the purpose of measuring the spacing of holes from an edge of a piece of work, while a gauging block is slidable longitudinally on the scale and is equipped with means for measuring the spacing of one hole from another.

Some of the advantages of the invention reside in its simplicity of construction, in its efficient and convenient operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a top plan view of the invention;

Figure 2 is an underside plan view thereof;

Figure 3 is a sectional detail, taken substantially in the plane of the line 3—3 in Figure 2;

Figure 4 is a sectional detail, taken substantially in the plane of the line 4—4 in Figure 1;

Figure 5 is a sectional detail, taken substantially in the plane of the line 5—5 in Figure 1 but with the gauging block slid on the scale to abut the enlarged head of the latter, and Figure 6 is a sectional detail, taken substantially in the plane of the line 6—6 in Figure 1, also showing the gauging block in abutment with the head of the scale.

Like characters of reference are employed to designate like parts in the specification and throughout the several views.

Referring now to the accompanying drawings in detail, the invention consists of a drilling gauge designated generally by the reference character 10, the same embodying in its construction an elongated scale 12 which is provided at one end thereof with an enlarged head 14, the under surface of the latter being equipped with a transverse channel 16 to slidably receive a ruler 18 extending at right angles to the scale 12, as will be clearly apparent.

A gauging block 20 is slidable longitudinally on the scale 12, this being effected by providing the under surface of the gauging block with a transverse channel 22, it being noted that longitudinal edges of the scale 12 as well as of the ruler 18 are downwardly and inwardly beveled, while the opposite side edges of the channels 16, 22 are complementally dovetailed, so that the ruler 18 is slidably retained in the head 14 and the block 20 is slidably retained on the scale 12.

Means are provided for locking the block 20 in a predetermined position on the scale 12, this means consisting of a locking screw 24 which is provided at its lower end with an enlarged head 26 (see Figure 4) disposed in a recess 28 with which the bottom surface of the block 20 is formed at one side of the channel 22, the head 26 having an undercut beveled edge 30 which is frictionally engageable with one of the beveled longitudinal edges of the scale 12 when a clamping nut 32, provided on the upper end portion of the screw 24, is tightened against the upper surface of the block 20.

A similar locking screw 34, provided with an undercut head 36 and with a clamping nut 38, is provided in the head 14 for locking the ruler 18 against sliding movement, it being noted that the respective bottom surfaces of the scale 12, head 14, ruler 18, block 20 and screw heads 26, 36 are all disposed in a common plane, so that the entire device may be positioned flatly upon the surface of the work which is to be drilled.

The head 14 is provided in one corner thereof with a locating aperture 40, while a locating pin 42 projects downwardly from an extension 44 with which the block 20 is provided.

If desired, the lower surface of the head 14 may be provided with a recess 46 to receive the extension 44 when the block 20 is slid into abutment with the head 14, so that the block and the head reinforce each other, so to speak, and protect each other against possible damage while the invention is being transported or stored when not in use.

Finally, it is to be observed that a detent or guide 48 projects downwardly from one end of the ruler 18, so that the latter may be properly aligned with an edge of the material which is to be drilled.

The head 14 is provided with a bevel 50 which affords a sharp edge 52 for reading the graduations 54 on the ruler 18, while the graduations 56 of the scale 12 may be read relative to the edge 58 of the gauging block 20.

When the invention is placed in use, it is applied flatly to the surface of a piece of work which is to be drilled, while the detent 48 engages one edge of the work, the ruler 18 being so adjusted that the edge 52 indicates on the graduations 54 the spacing of holes from the edge of the work, it being noted in this connection that the edge 52, if projected, would pass through the center of the locating aperture 40, as indicated by the phantom line 60 in Figure 1. Accordingly, if the detent 48 abuts the edge of the work and the graduations 54 on the ruler 18 indicate a dimension, for example, 3⅜ inches as shown in Figure 1, the center of the locating aperture 40 will be 3⅜ inches distant from the edge of the work, as will the center of the locating pin 42, which is also disposed on the projected line 60 of the edge 52. The edge of the work in Figure 1 is indicated by the reference character 62.

The gauging block 20 may then be adjusted on the scale 12 so that the distance 64 between the aperture 40 and the pin 42 conforms to the spacing of the holes which is desired, this spacing being readable directly by observing the position of the edge 58 of the block 20 on the graduations 56 of the scale 12.

A drill may then be inserted in the locating aperture 40 to form a hole in the material and, by sliding the entire device on the material so that the locating pin 42 is received in the drilled hole, the locating aperture 40 will then be in a position to again receive the drill for forming the next hole in a row.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A drilling gauge comprising a graduated beam, a substantially polygonal fixed head on one end of said beam, said head having a recess in a corner portion thereof and further having a locating aperture therein communicating with the recess, a ruler mounted for transverse sliding adjustment on the head, means for securing said ruler in adjusted position on the head, a block mounted for longitudinal sliding adjustment on the beam, means for securing the block in adjusted position on the beam, a member on the block engageable in the recess in the head, said member having an aperture therein registerable with the first-named aperture when said member is engaged in the recess, and a locating pin removably mounted in the second-named aperture and depending from the member.

MARLESS O. ELLINGTON.

REFERENCES CITED

The following references are of record in the file of this patent:

UNITED STATES PATENTS

| Number | Name | Date |
| --- | --- | --- |
| 1,191,906 | Miller et al. | July 18, 1916 |
| 1,545,424 | Heimrich | July 7, 1925 |
| 2,197,505 | Mosher | Apr. 16, 1940 |
| 2,326,412 | Taylor | Aug. 10, 1943 |

FOREIGN PATENTS

| Number | Country | Date |
| --- | --- | --- |
| 196,572 | Germany | Mar. 20, 1908 |
| 223,331 | Switzerland | Dec. 1, 1942 |